(12) United States Patent
Chen

(10) Patent No.: US 8,201,549 B2
(45) Date of Patent: Jun. 19, 2012

(54) GRILLING APPARATUS WITH HEATING DEVICE FOR PROMOTING COMBUSTION EFFICIENCY OF GAS BOTTLES

(75) Inventor: Jan-Nan Chen, Taichung (TW)

(73) Assignee: Pro-Iroda Industries, Inc., Taichung (TW)

( * ) Notice: Subject to any disclaimer, the term of this patent is extended or adjusted under 35 U.S.C. 154(b) by 576 days.

(21) Appl. No.: 12/269,937

(22) Filed: Nov. 13, 2008

(65) Prior Publication Data

US 2009/0159072 A1 Jun. 25, 2009

(30) Foreign Application Priority Data

Dec. 24, 2007 (TW) .............................. 96149786 A

(51) Int. Cl.
*A47J 37/00* (2006.01)
*A47F 5/08* (2006.01)

(52) U.S. Cl. ....... 126/1 R; 125/41 R; 125/50; 125/39 B; 248/231.9; 99/385

(58) Field of Classification Search ................ 126/39 R, 126/41 R, 50, 39 B; 99/447, 259, 385; 248/231.9
See application file for complete search history.

(56) References Cited

U.S. PATENT DOCUMENTS

| | | | | | |
|---|---|---|---|---|---|
| 1,714,264 | A | * | 5/1929 | Goldberg et al. | 126/38 |
| 2,267,113 | A | * | 12/1941 | Kyprie | 248/102 |
| 3,139,879 | A | * | 7/1964 | Bauer et al. | 125/4 |
| 3,310,270 | A | * | 3/1967 | Ciancio | 248/210 |
| 4,458,933 | A | * | 7/1984 | Thomas | 294/31.2 |
| 4,796,936 | A | * | 1/1989 | Sherin | 294/31.2 |
| 5,413,087 | A | * | 5/1995 | Jean | 126/41 R |
| 5,458,309 | A | * | 10/1995 | Craven et al. | 248/231.9 |
| 5,782,230 | A | * | 7/1998 | Linnebur et al. | 126/41 R |
| 5,983,883 | A | * | 11/1999 | Moulder | 126/38 |
| 6,553,985 | B1 | * | 4/2003 | Gafford | 126/41 R |
| 7,028,684 | B2 | * | 4/2006 | Johnson | 126/41 R |

* cited by examiner

*Primary Examiner* — Steven B McAllister
*Assistant Examiner* — Nikhil Mashruwala
(74) *Attorney, Agent, or Firm* — Alan Kamrath; Kamrath IP Lawfirm, PA

(57) ABSTRACT

A heating device for a gas bottle includes a conduction heat shaft having a first end adjacent to a heat source and a second end, a conduction heat plate including a plate body and a pivoting portion formed on the plate body and pivotally connected to the second end of the conduction heat shaft, and a connector provided with the conduction heat plate and coupling with the second end of the conduction heat shaft to attach the gas bottle with the plate body of the conduction heat plate.

16 Claims, 10 Drawing Sheets

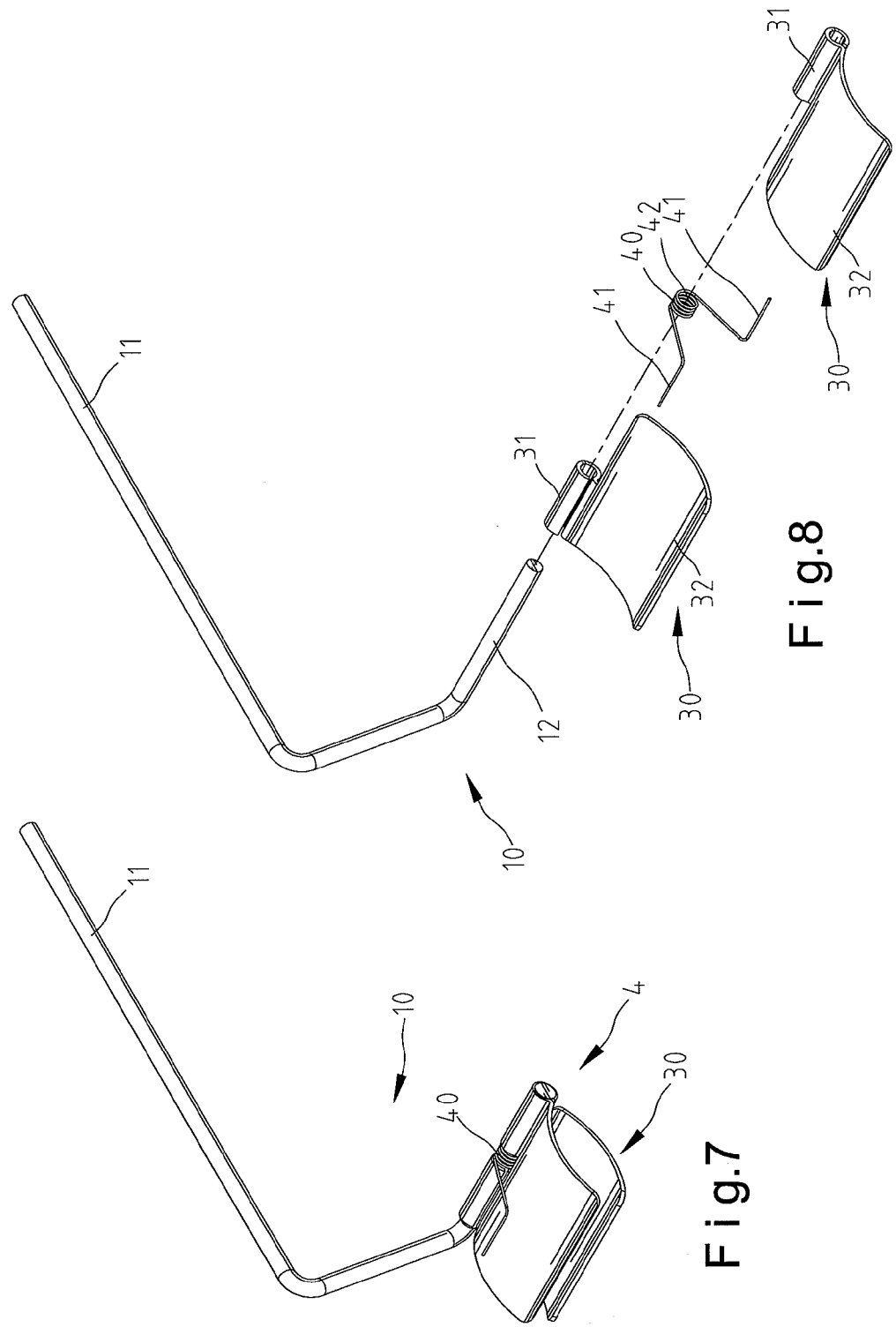

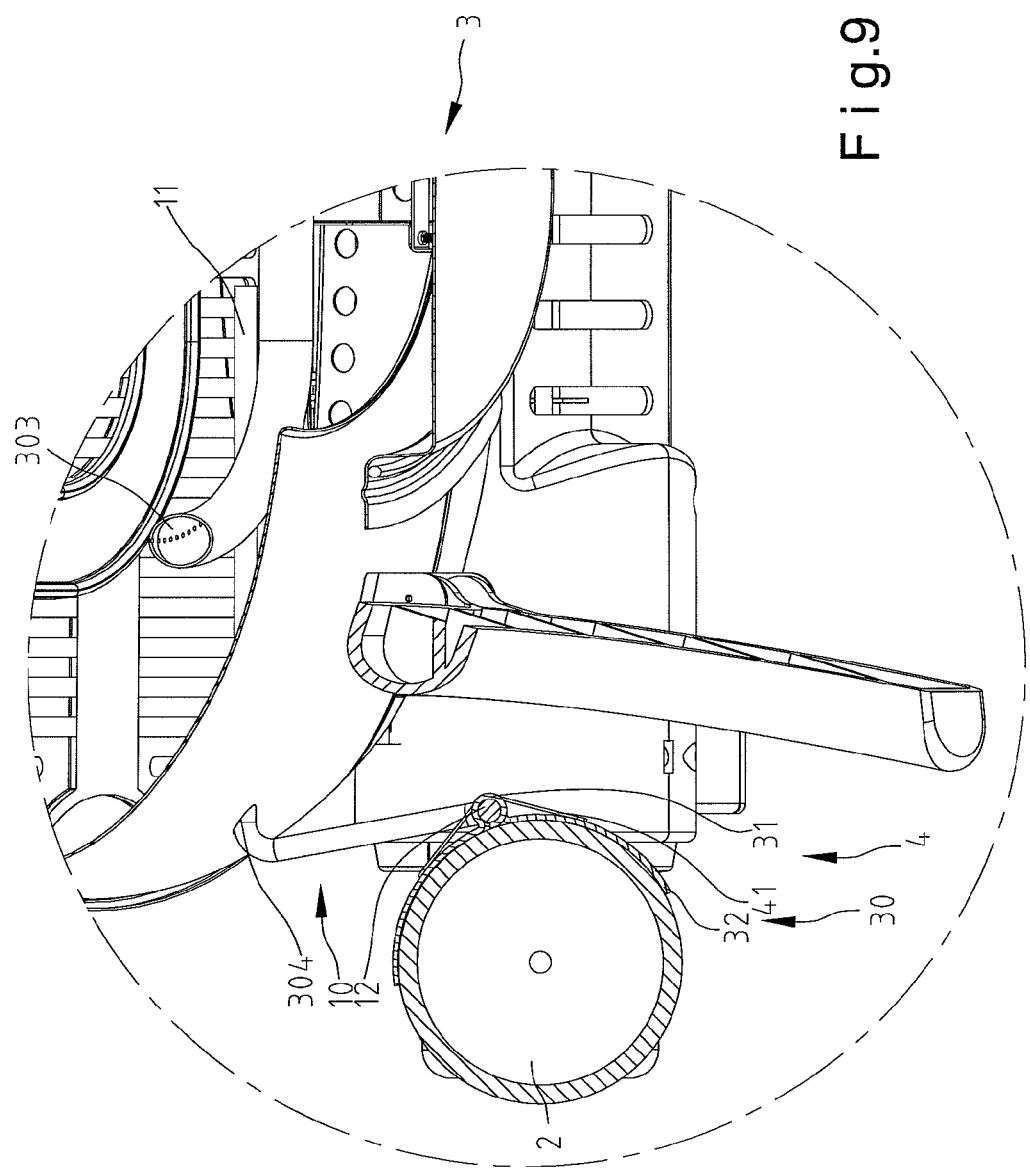

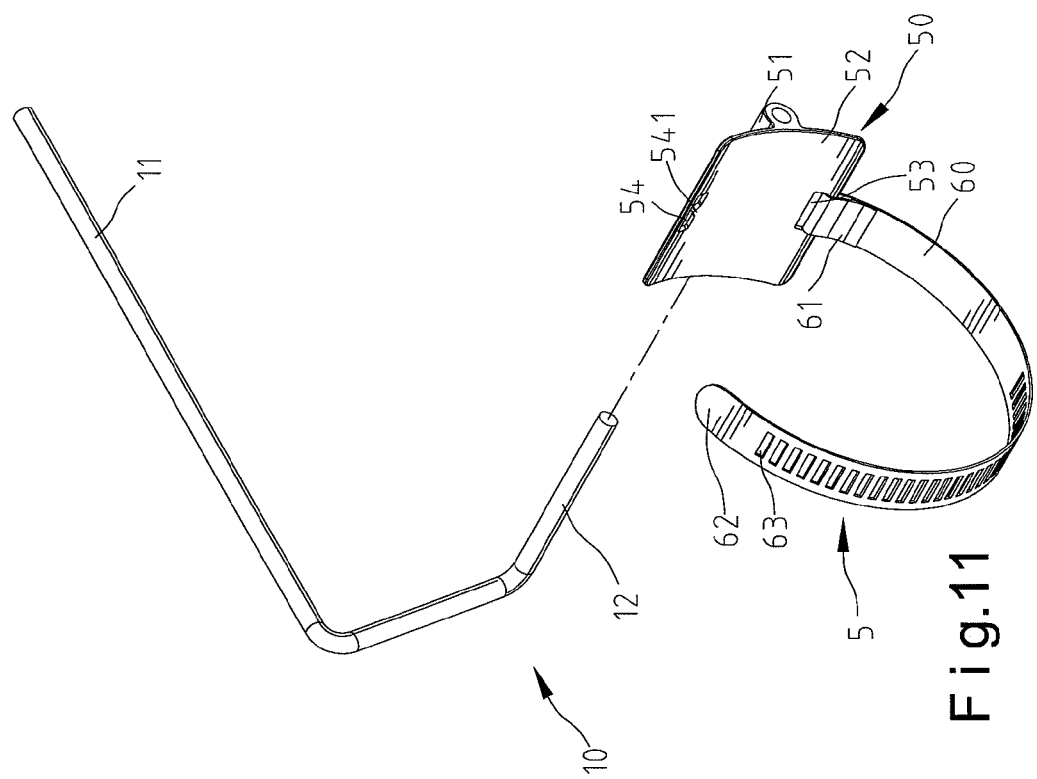
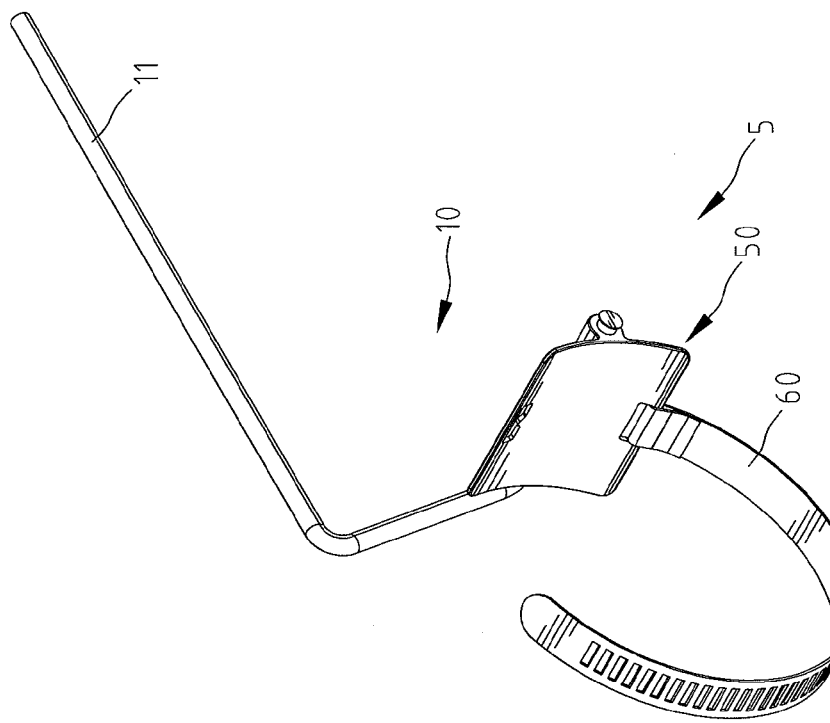

GRILLING APPARATUS WITH HEATING DEVICE FOR PROMOTING COMBUSTION EFFICIENCY OF GAS BOTTLES

BACKGROUND OF THE INVENTION

The present invention relates to a heating device for promoting combustion efficiency of gas bottles. More particularly, the present invention relates to a heating device for a grilling apparatus for promoting combustion efficiency of gas bottles.

SUMMARY OF THE INVENTION

A heating device for a gas bottle includes a conduction heat shaft having a first end and a second end, with the first end adjacent to a heat source, a conduction heat plate including a plate body and a pivoting portion formed on the plate body and pivotally connected to the second end of the conduction heat shaft, and a connector provided with the conduction heat plate and coupling with the second end of the conduction heat shaft to attach a gas bottle with the plate body of the conduction heat plate.

BRIEF DESCRIPTION OF THE DRAWINGS

The detailed description and technical characteristics of the present invention are described together with the drawings as follows.

FIG. 7 is a perspective view of a heating device according to the second embodiment of the present invention.

FIG. 8 is an exploded view of the heating device shown in FIG. 7.

FIG. 9 is a partial, front, sectional view of the grilling apparatus with the heating device according to the second embodiment of the present invention.

FIG. 10 is a perspective view of a heating device according to the third embodiment of the present invention.

FIG. 11 is an exploded view of the heating device shown in FIG. 10.

DETAILED DESCRIPTION OF THE PREFERRED EMBODIMENT

With reference to the appended drawings, a grilling apparatus according to a first embodiment of the present invention will be explained.

Figure 1:
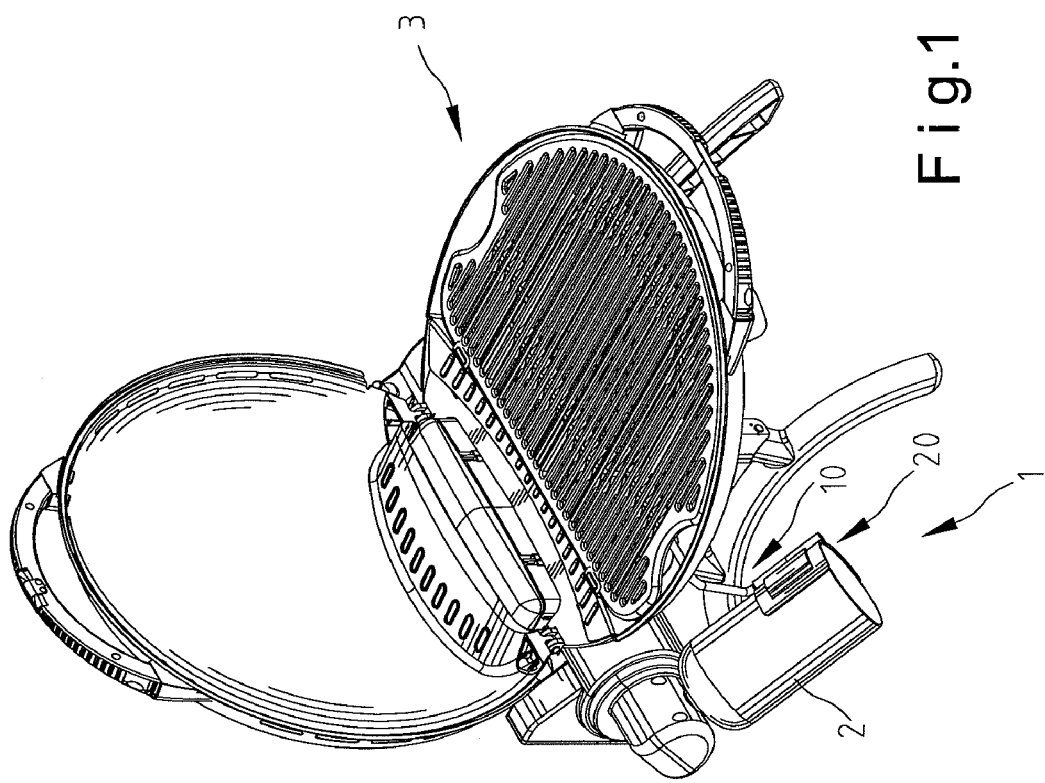
FIG. 1 shows a perspective view of a grilling apparatus with a heating device according to the first embodiment of the present invention.
Figure 2:
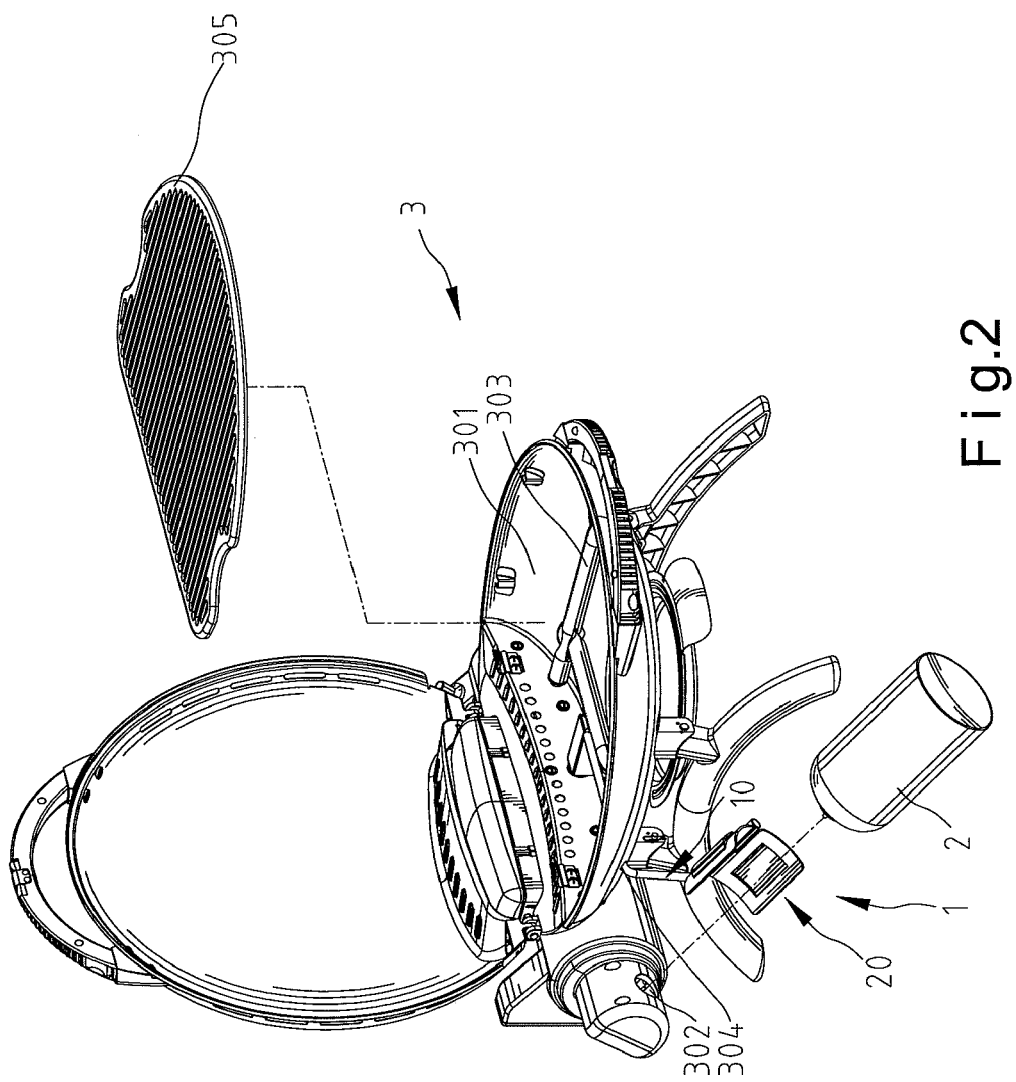
FIG. 2 is an exploded view of the grilling apparatus shown in FIG. 1.

As shown in FIGS. 1 and 2, a grilling apparatus includes a heating device 1, a gas bottle 2 disposed in the heating device 1 and a stove 3. The heating device 1 is inserted into the stove 3, and thermal energy can be conducted from the interior of the stove 3 to the gas bottle 2 for heating the gas bottle 2.

The stove 3 includes a main body 301, a joint 302 provided on a side thereof, a stove burner 303 disposed in the main body 301 for providing a heat source to the stove 3, a through-hole 304 formed on a side of the main body 301 and inserted by the heating device 1 and a grill 305 disposed therein above the stove burner 303. The stove burner 303 and the joint 302 communicate with each other.

Figure 3:
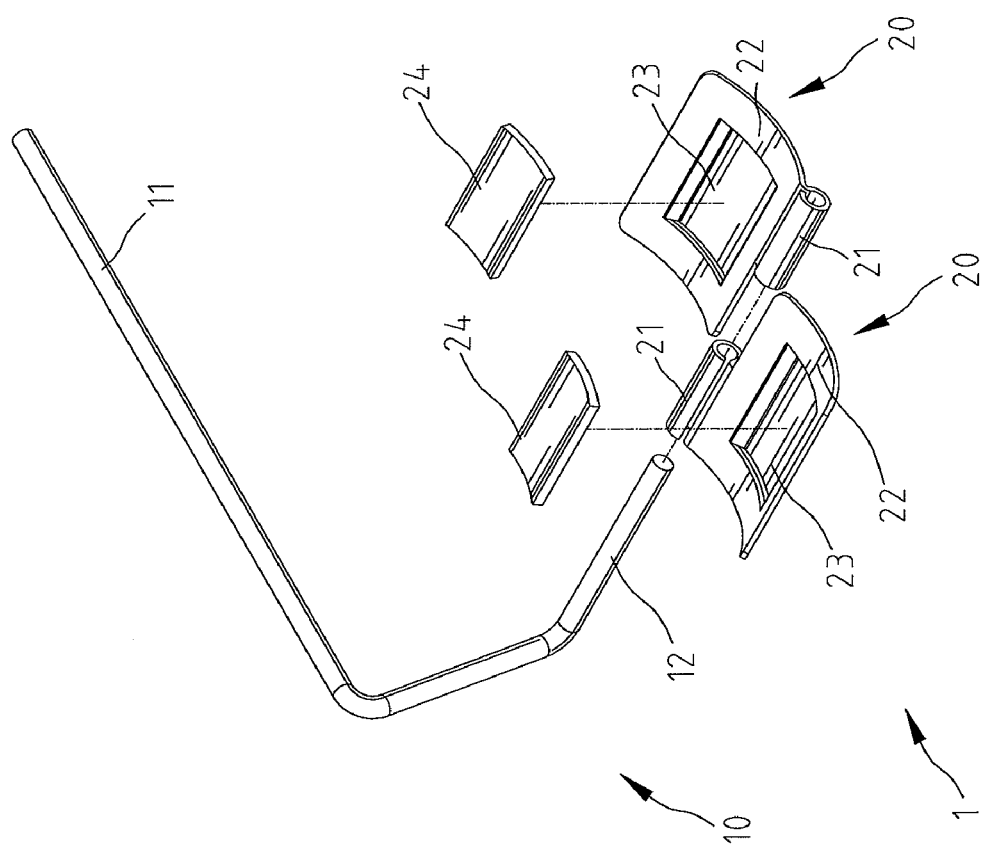
FIG. 3 is an exploded view of the heating device shown in FIG. 1.
Figure 4:
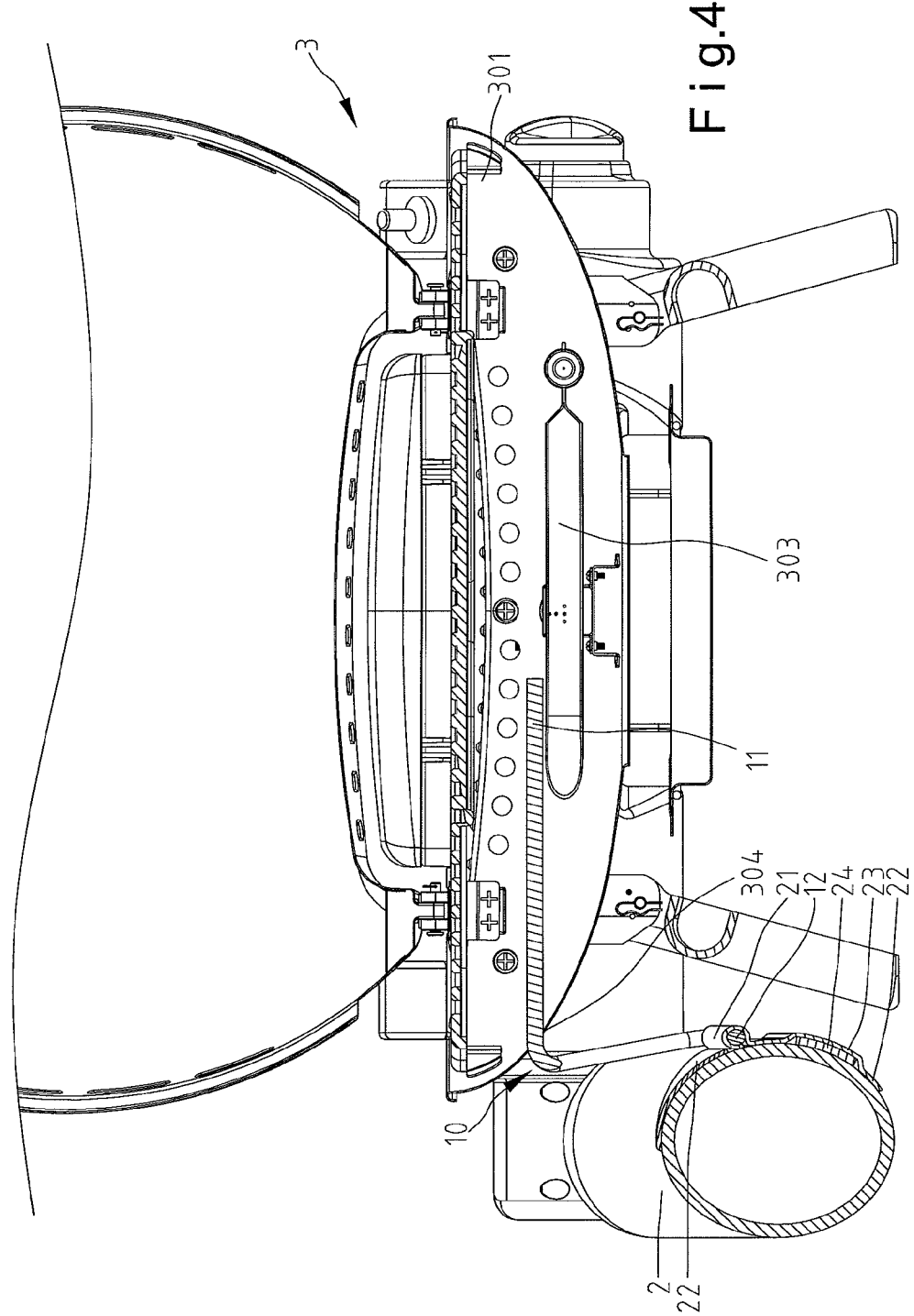
FIG. 4 is a front view of the grilling apparatus with the heating device shown in FIG. 1.

Referring to FIGS. 3 and 4, the heating device 1 includes an approximately L-shaped conduction heat shaft 10 that is made of metal having a first end 11 and a second end 12 and two conduction heat plates 20 installed to the second end 12. The first end 11 is inserted through the through-hole 304 toward the interior of the stove 3 and disposed between the stove burner 303 and the grill 305. The first end 11 is alternatively abutted against the stove burner 303. Thus, the first end 11 of the conduction heat shaft 10 can conduct the thermal energy from the stove burner 303 to the second end 12 of the conduction heat shaft 10 and the conduction heat plates 20.

Each conduction heat plate 20 includes a plate body 22, a pivoting portion 21 provided on a side of the plate body 22 and inserted via the second end 12 of the conduction heat shaft 10, a concavity 23 formed on the center of the plate body 22 and a connector 24 installed in the concavity 23. The plate body 22 is preferably arcuate for increasing contact area between the conduction heat plates 20 and the gas bottle 2. Cooperation of the conduction heat plates 20 receives the gas bottle 2, with the concavities 23 of the conduction heat plates 20 being disposed adjacent the gas bottle 2 and with the plate bodies 22 being provided on two sides of the second end 12 of the conduction heat shaft 10 respectively. The connector 24 is a magnetic material in this embodiment to attach the gas bottle 2 between the conduction heat plates 20. Therefore, the thermal energy that is conducted to the conduction heat plates 20 via the first end 11 can be conducted to the gas bottle 2 for heating the gas bottle 2. Since in the present invention the manner of thermal energy transportation from the stove 3 to the gas bottle 2 is by thermal conduction rather than thermal radiation, it can transport the thermal energy efficiently without thermal energy loss.

The conduction heat shaft 10 and the conduction heat plates 20 are preferably copper, aluminum, silver or iron, with all of these metals having great heat conduction performance. However, to give consideration to both heat conduction performance and economic benefits, the conduction heat shaft 10 can be made of copper, and the conduction heat plates 20 can be made of iron or stainless steel.

Figure 5:
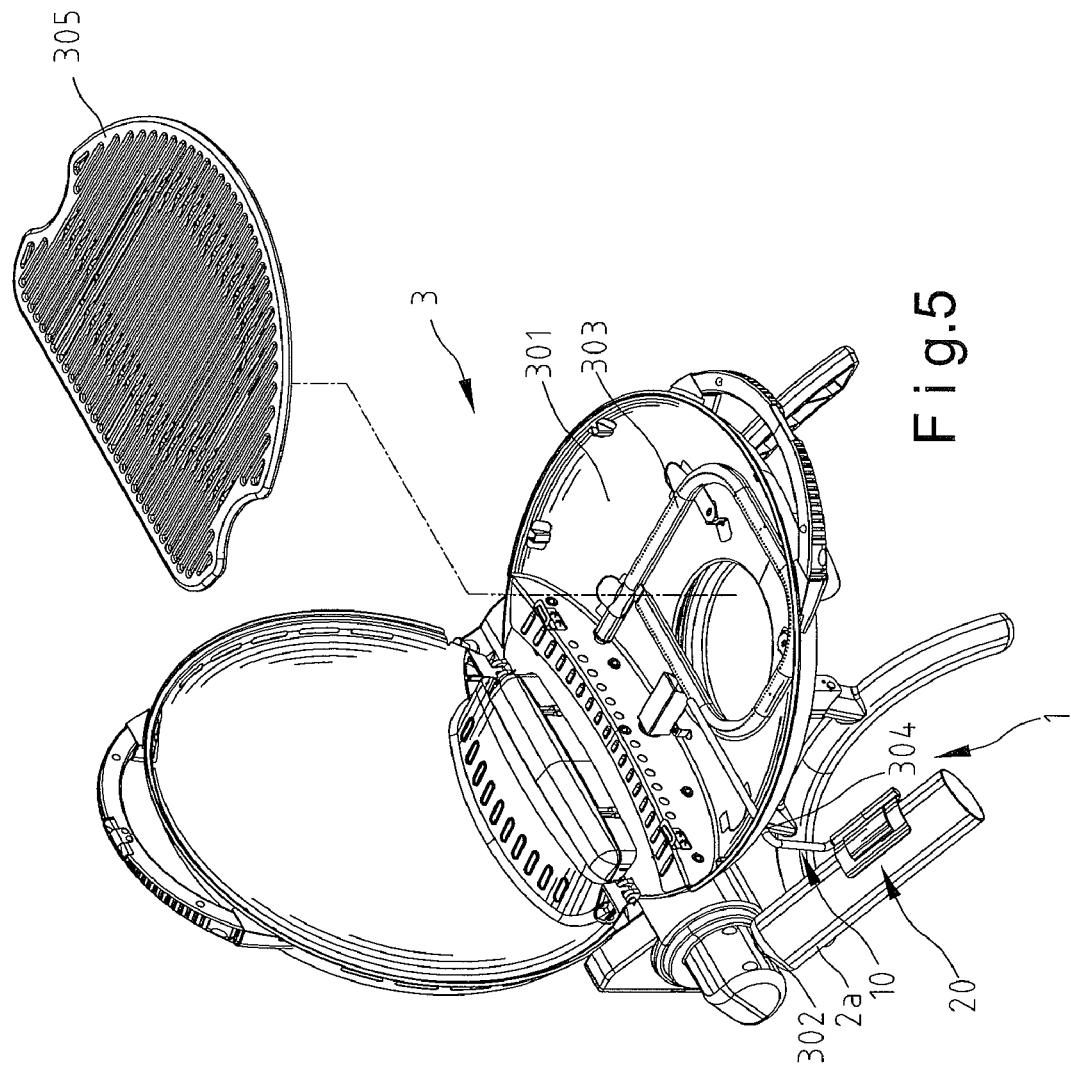
FIG. 5 shows another perspective view of the grilling apparatus shown in FIG. 1.
Figure 6:
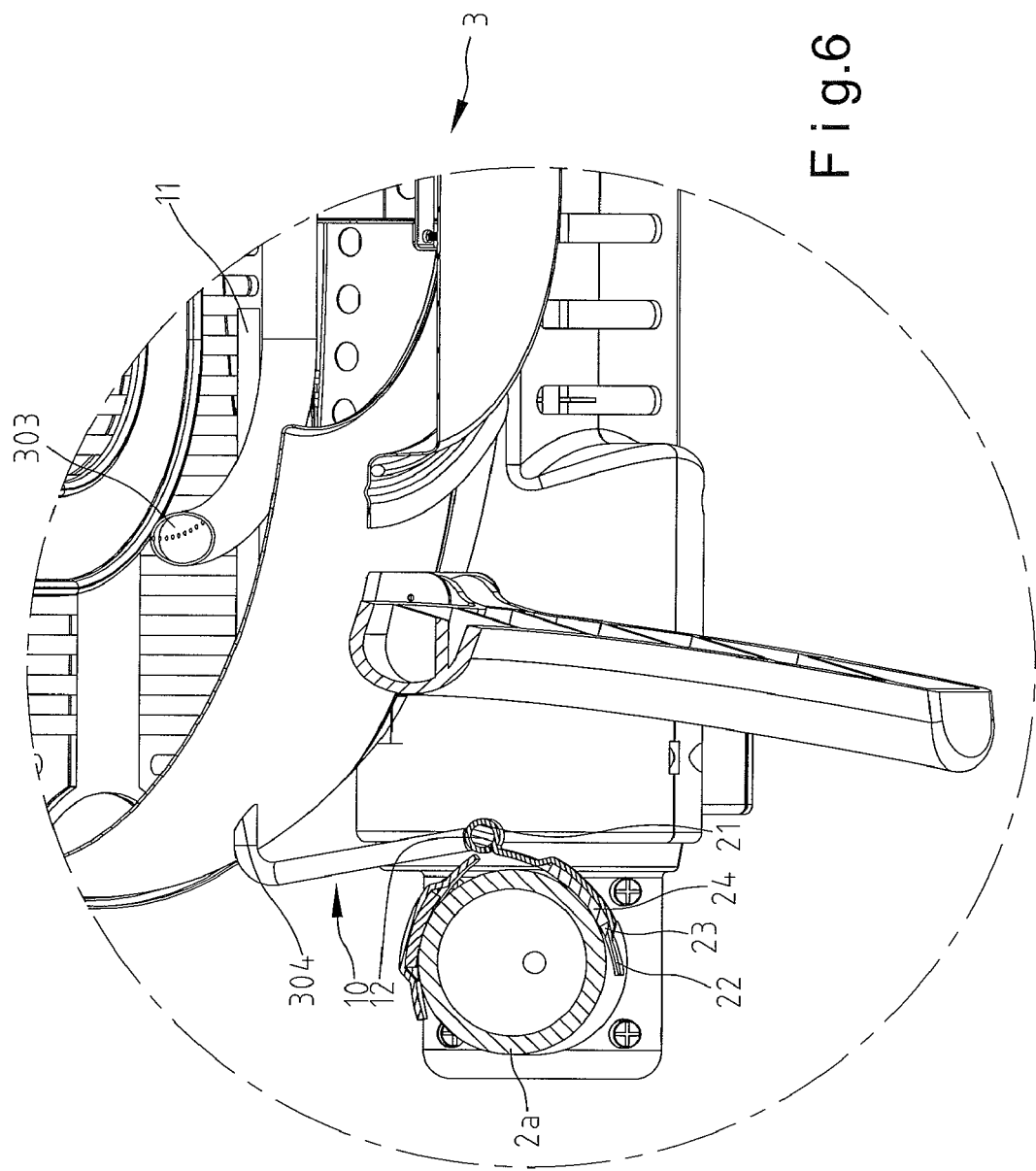
FIG. 6 is a partial, front, sectional view of the grilling apparatus with the heating device shown in FIG. 5.

Referring to FIGS. 5 and 6, another gas bottle 2a is received in the heat device 1 and attached via the connectors 24. A diameter of the gas bottle 2a is different from a diameter of the gas bottle 2.

As shown in FIGS. 7 through 9, a heating device 4 in accordance with a second embodiment of the present invention is installed to the stove 3 and adapted for receiving gas bottles. The heating device 4 is provided to insert through the through-hole 304 of the stove 3 and includes a conduction heat shaft 10, two conduction heat plates 30 and connectors 40. The conduction heat shaft 10 is the same as the first embodiment.

Each conduction heat plate 30 includes a plate body 32 and a pivoting portion 31 provided on a side of the plate body 32. The plate body 32 is preferably arcuate for increasing contact area between the conduction heat plates 30 and the gas bottle 2. Moreover, each plate body 32 has a first surface and a second surface. Cooperation of the conduction heat plates 30 receives the gas bottle 2, with the second surfaces of the plate bodies 32 abutted against the gas bottle 2 and with the plate bodies 32 being provided on two sides of the second end 12 of the conduction heat shaft 10 respectively. The connector 40 is an elastic material in this embodiment and includes two legs 41 and an elastic portion 42, with each leg 41 being L-shaped and with the elastic portion 42 provided for connecting the legs 41 to each other. The second end 12 of the conduction heat shaft 10 is inserted through the pivoting portion 31 of one conduction heat plate 30, the elastic portion 42 of the connector 40 and the pivoting portion 31 of another conduction heat plate 30 in sequence. In this embodiment, the connector 40 is preferred to be a torsion spring. The legs 41 of the connector 40 are adapted to abut against the first surfaces of the plate bodies 32, respectively, for drawing the plate bodies 32 close to each other via elasticity of the connector 40 to attach the gas bottle 2 between the conduction heat plates 30. The thermal energy that is conducted to the conduction heat plates 30 of the heating device 4 via the first end 11 can be conducted to the gas bottle 2 for heating the gas bottle 2.

Figure 12:
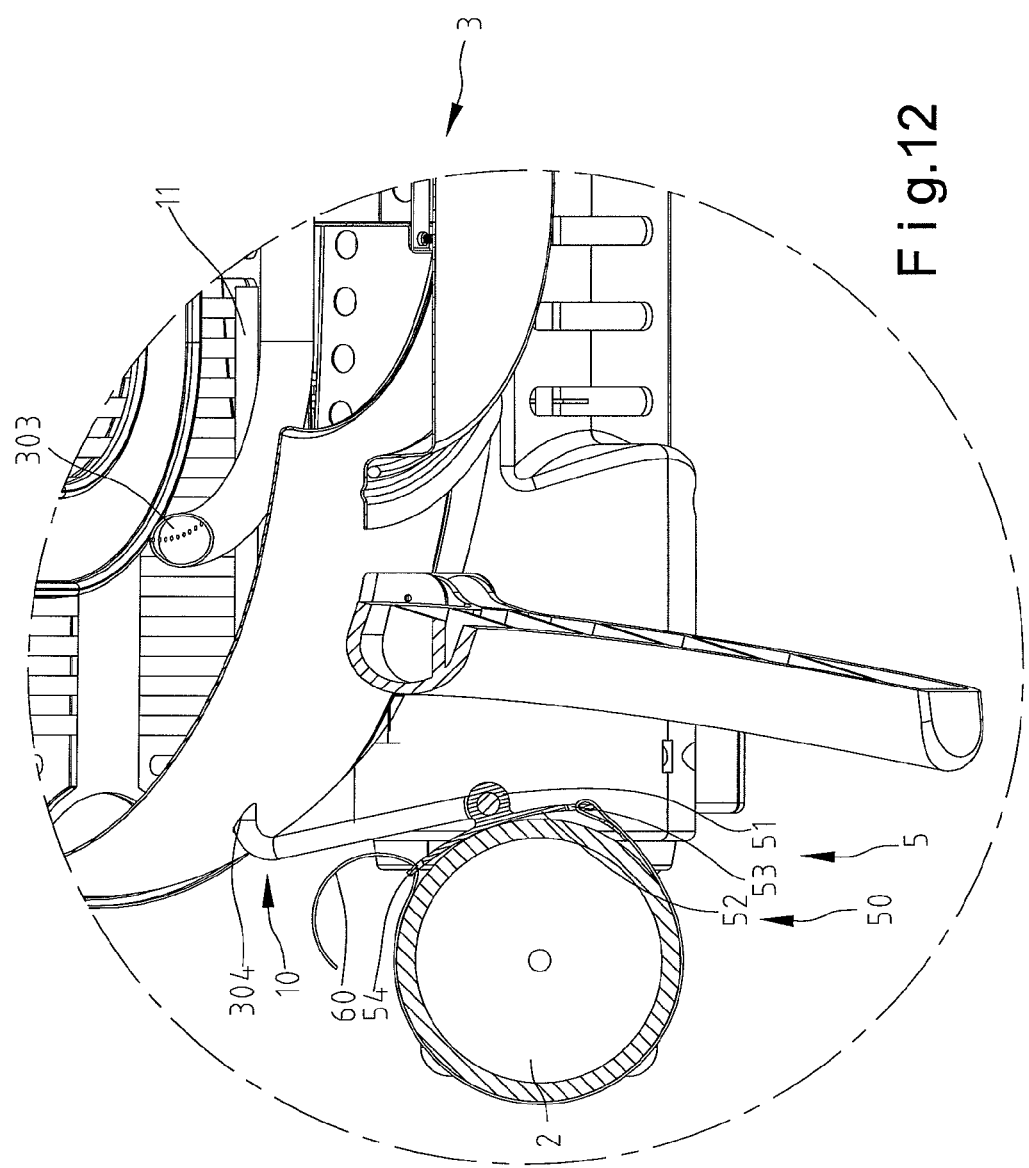
FIG. 12 is a partial, front, sectional view of the grilling apparatus with the heating device according to the third embodiment of the present invention.

As shown in FIGS. 10 through 12, a heating device 5 in accordance with a third embodiment of the present invention is installed to the stove 3 and adapted for receiving gas bottles. The heating device 5 is inserted through the through-hole 304 of the stove 3 and includes a conduction heat shaft 10, a conduction heat plate 50 and a connector 60. The conduction heat shaft 10 is the same as the first embodiment. The conduction heat plate 50 includes a plate body 52 having a first surface and a second surface and a pivoting portion 51 provided on the second surface of the plate body 52, with the first surface of the plate body 52 abutting against the gas bottle 2. A first connected hole 53 and a second connected hole 54 are formed on two sides of the plate body 52, respectively, and opposite to each other. A protrusion 541 is defined in the second connected hole 54. The connector 60 is preferred to be a metal strip and includes a fixed end 61 inserted and fixed to the first connected hole 53, an adjusted end 62 extending from the fixed end 61 and a plurality of connected holes 63 provided thereon between the fixed and adjusted ends 61 and 62. While the adjusted end 62 is inserted through the second connected hole 54, one of the connected holes 63 is coupled to the protrusion 541 selectively to form an approximate round shape via the plate body 52 and the connector 60 for attaching the gas bottle 2. The circumference of the round shape can be adjusted to fit the circumference of various gas bottles.

Deliberative but not limiting descriptions of the embodiments of the present invention have been made. However, it should be understood that the technical staffs in this field may make changes and/or modifications without being away from the related scope of protection as defined in the Claims.

What is claimed is:

1. A grilling apparatus utilizing a gas bottle, the grilling apparatus comprising:
a stove including a main body, a joint provided on a side thereof, a stove burner disposed in the main body providing a heat source to the stove and a through-hole formed on a side of the main body;
a heating device comprising:
a conduction heat shaft having a circular cross section and having a first end and a second end opposite to the first end, with the first end inserted through the through-hole and abutting the stove burner;
first and second conduction heat plates, each including a plate body having a first edge and a second edge opposite to the first edge and including a pivoting portion formed on the first edge of the plate body and pivotally connected about a pivot axis defined by a longitudinal axis of the second end of the conduction heat shaft, with the second edges of the first and second conduction heat plates having a variable spacing therebetween, the variable spacing varying with pivotal movement of the first and second conduction heat plates to accommodate gas bottles of different diameters; and
a connector provided with each conduction heat plate to attach the gas bottle with the plate body of the conduction heat plate;
wherein the stove burner, the conduction heat shaft, the conduction heat plates, and the connectors form a thermal energy conduction path to heat the gas bottle accommodated in the first and second conduction heat plates.

2. The grilling apparatus as claimed in claim 1, further comprising a concavity formed on the conduction heat plate and receiving the connector; wherein the connector is magnetic material.

3. The grilling apparatus as claimed in claim 2, wherein the heating device includes another conduction heat plate having a plate body and a pivoting portion, with the second end of the conduction heat shaft inserted through the pivoting portion of the other conduction heat plate, with the plate bodies of the conduction heat plates provided on two sides of the second end of the conduction heat shaft respectively.

4. The grilling apparatus as claimed in claim 3, wherein the connector is a torsion spring, with the second end of the conduction heat shaft inserted through the pivoting portion of the conduction heat plate, the connector and the pivoting portion of the conduction heat plate in sequence.

5. The grilling apparatus as claimed in claim 4, with the connector having an elastic portion and two legs connected to the elastic portion respectively, with the elastic portion inserted by the second end of the conduction heat shaft, with the legs abutted against the plate bodies of the conduction heat plates respectively.

6. The grilling apparatus as claimed in claim 1, with the plate body having a second connected hole, with the connector being a metal strip and having a fixed end coupled to a side of the plate body opposite to the second connected hole, an adjusted end inserted through the second connected hole and a plurality of the connected holes provided in the connector between the fixed and adjusted ends and selectively coupling to the second connected hole.

7. The grilling apparatus as claimed in claim 6, with the second connected hole having a protrusion for coupling to one of the plurality of connected holes.

8. The grilling apparatus as claimed in claim 1, with the plate body of the conduction heat plate being arcuate.

9. A grilling apparatus utilizing a gas bottle, the grilling apparatus comprising:
a stove including a main body, a joint provided on a side thereof, a stove burner disposed in the main body providing a heat source to the stove, a grill, and a through-hole formed on a side of the main body;
a heating device comprising:
a conduction heat shaft having a circular cross section and having a first end and a second end opposite to the first end, with the first end of the conduction heat shaft inserted through the through-hole toward the interior of the stove and disposed between the stove burner and the grill;
first and second conduction heat plates, each including a plate body having a first edge and a second edge opposite to the first edge and including a pivoting portion formed on the first edge of the plate body and pivotally connected about a pivot axis defined by a longitudinal axis of the second end of the conduction heat shaft, with the second edges of the first and second conduction heat plates having a variable spacing therebetween, the variable spacing varying with pivotal movement of the first and second conduction heat plates to accommodate gas bottles of different diameters; and a connector provided with each conduction heat plate to attach the gas bottle with the plate body of the conduction heat plate;

wherein the stove burner, the conduction heat shaft, the conduction heat plates, and the connectors form a thermal energy conduction path to heat the gas bottle accommodated in the first and second conduction heat plates.

10. The grilling apparatus as claimed in claim 9, further comprising a concavity formed on the conduction heat plate and receiving the connector; wherein the connector is magnetic material.

11. The grilling apparatus as claimed in claim 10, wherein the heating device includes another conduction heat plate having a plate body and a pivoting portion, with the second end of the conduction heat shaft inserted through the pivoting portion of the other conduction heat plate, with the plate bodies of the conduction heat plates provided on two sides of the second end of the conduction heat shaft respectively.

12. The grilling apparatus as claimed in claim 11, wherein the connector is a torsion spring, with the second end of the conduction heat shaft inserted through the pivoting portion of the conduction heat plate, the connector and the pivoting portion of the other conduction heat plate in sequence.

13. The grilling apparatus as claimed in claim 12, with the connector having an elastic portion and two legs connected to the elastic portion respectively, with the elastic portion inserted by the second end of the conduction heat shaft, with the legs abutted against the plate bodies of the conduction heat plates respectively.

14. The grilling apparatus as claimed in claim 9, with the plate body having a second connected hole, with the connector being a metal strip and having a fixed end coupled to a side of the plate body opposite to the second connected hole, an adjusted end inserted through the second connected hole and a plurality of connected holes provided in the connector between the fixed and adjusted ends and selectively coupling to the second connected hole.

15. The grilling apparatus as claimed in claim 14, with the second connected hole having a protrusion for coupling to one of the plurality of connected holes.

16. The grilling apparatus as claimed in claim 9, with the plate body of the conduction heat plate being arcuate.

* * * * *